US012746790B2

(12) United States Patent
Tsuchiya et al.

(10) Patent No.: US 12,746,790 B2
(45) Date of Patent: Sep. 29, 2026

(54) YAWING RESTRICTING DEVICE

(71) Applicant: TOKYO KEIKI INC., Tokyo (JP)

(72) Inventors: Kenji Tsuchiya, Tokyo (JP); Tooru Kikuchi, Tokyo (JP); Takao Murakoshi, Tokyo (JP)

(73) Assignee: Tokyo Keiki Inc., Tokyo (JP)

( * ) Notice: Subject to any disclaimer, the term of this patent is extended or adjusted under 35 U.S.C. 154(b) by 294 days.

(21) Appl. No.: 18/567,051

(22) PCT Filed: Mar. 25, 2022

(86) PCT No.: PCT/JP2022/014315
§ 371 (c)(1),
(2) Date: Dec. 5, 2023

(87) PCT Pub. No.: WO2022/259707
PCT Pub. Date: Dec. 15, 2022

(65) Prior Publication Data

US 2024/0262140 A1 Aug. 8, 2024

(30) Foreign Application Priority Data

Jun. 8, 2021 (JP) ................................ 2021-096123

(51) Int. Cl.
*B60D 1/30* (2006.01)
*B60D 1/01* (2006.01)

(52) U.S. Cl.
CPC ................ *B60D 1/30* (2013.01); *B60D 1/01* (2013.01)

(58) Field of Classification Search
USPC .......................................................... 280/480
See application file for complete search history.

(56) References Cited

U.S. PATENT DOCUMENTS 4,930,800 A * 6/1990 Jean-Luc ................ B60D 1/40 280/446.1
2009/0045603 A1* 2/2009 Huntimer ................ B60D 1/30 280/455.1
2020/0062306 A1* 2/2020 Shoshan ................ B60D 1/32

FOREIGN PATENT DOCUMENTS

CN 103624765 A 3/2014
CN 107152431 A 9/2017
(Continued)

OTHER PUBLICATIONS

Corresponding European Patent Application No. 22819896.6, Extended European Search Report, date mailed Aug. 26, 2024, 7 pages.
(Continued)

*Primary Examiner* — Valentin Neacsu
*Assistant Examiner* — Morgan Knauf
(74) *Attorney, Agent, or Firm* — Cooper Legal Group LLC

(57) ABSTRACT

A yawing restricting device provided in a first vehicle to restrict yawing, the first vehicle and a second vehicle being coupled to each other in succession in a traveling direction such that one of the first vehicle or the second vehicle is capable of yawing, the yawing restricting device includes a first contact portion provided to be able to contact with the second vehicle on one side of the first vehicle in an axle direction with respect to a yaw axis, a second contact portion provided to be able to contact with the second vehicle in the other side in the axle direction with respect to the yaw axis, a first restriction driving portion that drives the first contact portion to be in contact with the second vehicle, and a second restriction driving portion that drives the second contact portion to be in contact with the second vehicle.

2 Claims, 9 Drawing Sheets

(56) References Cited

FOREIGN PATENT DOCUMENTS

| | | | | | |
|---|---|---|---|---|---|
| CN | 110774844 | A | * | 2/2020 | ............. B60D 1/249 |
| CN | 111361368 | A | * | 7/2020 | ............. B60D 1/322 |
| EP | 2436540 | A1 | * | 4/2012 | ........... B62D 15/027 |
| EP | 3623179 | A2 | | 3/2020 | |
| JP | S54-112211 | U1 | | 8/1979 | |
| JP | H6-55968 | U | | 8/1994 | |
| JP | H0655968 | U | * | 8/1994 | |
| JP | H7-17689 | U | | 3/1995 | |
| JP | 5832690 | B | | 12/2015 | |

OTHER PUBLICATIONS

Corresponding International Patent Application No. PCT/JP2022/014315, International Search Report, date mailed Jun. 7, 2022, 5 pages.

Corresponding International Patent Application No. PCT/JP2022/014315, Written Opinion, date mailed Jun. 7, 2022, 8 pages.

Corresponding China Intellectual Property Office Application No. 202280038228.2, Office Action dated May 22, 2026, 12 pages.

* cited by examiner

YAWING RESTRICTING DEVICE

FIELD

The present invention relates to a moving device in which a plurality of vehicles are coupled.

BACKGROUND ART

Conventionally, a moving device in which a plurality of vehicles are coupled together in a traveling direction has been known. In this type of moving device, adjacent vehicles are movably coupled to each other around a yaw axis, and whereby the traveling direction of the moving device can be changed. Further, in a moving device movable on a plane perpendicular to or intersecting a horizontal plane, such as a wall surface of a structure, each vehicle is configured to adhere to the wall surface, and the adjacent vehicles are movably coupled to each other around a pitch axis.

As the related art, there is a known structure inspection robot that includes a main body provided with inspection devices and a pair of front wheels and a pair of rear wheels each having a plurality of magnets circumferentially disposed on the outer diameter side and conical contact portions disposed on both sides in a width direction, and, when the front wheels and the rear wheels adhere to a steel member of a bridge so as to be driven to rotate, travels along the steel member (see Patent Literature 1).

CITATION LIST

Patent Literature

Patent Literature 1: U.S. Pat. No. 5,832,690

SUMMARY OF INVENTION

Technical Problem

In the moving device as described above, sometimes the swing around the yaw axis between adjacent vehicles, that is, yawing needs to be restricted. Such a situation includes a case in which, for example, when the moving device is moved straight, some vehicles that move between the horizontal surface to the wall surface are caused to swing around the pitch axis relative to subsequent vehicles.

In order to restrict yawing, it is conceivable to apply a driving force to the yaw axis so as to resist the force for yawing the vehicle. In this case, a larger driving force is required than the force for yawing the vehicle and the weight of the driving unit that rotates around the yaw axis increases.

One or more embodiments of the present invention have been conceived in view of the above, and an object thereof is to provide a yawing restricting device capable of restricting yawing with a smaller driving force.

Solution to Problem

In order to solve the above-mentioned problems, a yawing restricting device according to this embodiment is provided in a first vehicle to restrict yawing, where the first vehicle and a second vehicle are coupled to each other in succession in a traveling direction such that one of the first vehicle or the second vehicle is capable of yawing. The yawing restricting device includes a first contact portion provided to be able to contact with the second vehicle on one side of the first vehicle in an axle direction with respect to a yaw axis, a second contact portion provided to be able to contact with the second vehicle in the other side in the axle direction with respect to the yaw axis, a first restriction driving portion that drives the first contact portion so as to be in contact with the second vehicle, and a second restriction driving portion that drives the second contact portion so as to be in contact with the second vehicle.

Effects of the Invention

According to an embodiment of the present invention, yawing can be restricted with a smaller driving force.

DESCRIPTION OF EMBODIMENTS

The following is a description of the embodiment of the invention with reference to the drawings.

Overall Configuration of Moving Device

Figure 1:
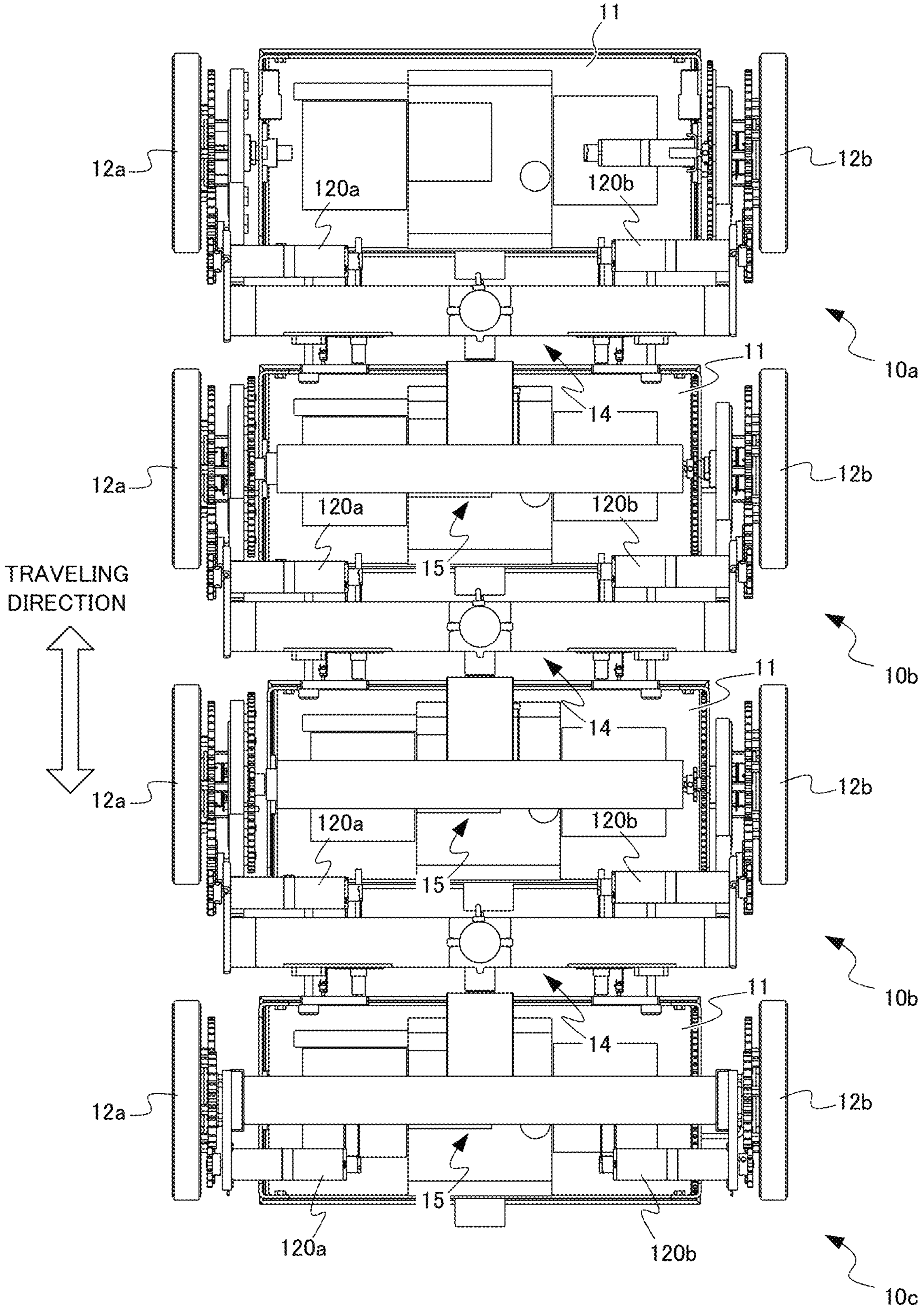
FIG. 1 is a plan view of a moving device according to an embodiment.

Overall configuration of a moving device according to the present embodiment will be described. FIG. 1 is a plan view of the moving device according to the present embodiment.

As shown in FIG. 1, a moving device 1 according to the present embodiment is configured to adhere to a wall surface to be movable thereon, and includes a plurality of coupled vehicles movable around a pitch axis and a yaw axis. The moving device 1 includes four vehicles 10 (10*a*, 10*b*, 10*b*, 10*c*) each having two wheels 12*a* and 12*b*. Each of vehicles 10 is capable of moving in at least one direction by two wheels 12*a* and 12*b*, and adjacent vehicles in the traveling direction are coupled to each other. The moving device 1 may preferably have at least two vehicles 10.

The vehicle 10*a* located at the head of the moving device 1, that is, at the forward end in the traveling direction, includes a large link 14 to be described in detail below. The vehicle 10*c* located at the rear end of the moving device 1, that is, at the backward end in the traveling direction, includes a small link 15 be described in detail below. The two vehicles 10*b* located between the vehicle 10*a* and the vehicle 10*c* each include a large link 14 and a small link 15 having a pitch driving mechanism. In the moving device 1, the two vehicles 10 adjacent in the traveling direction are coupled when the large link 14 of one vehicle is coupled to the small link 15 of the other vehicle, as will be described in detail later.

As described above, the vehicles 10*a*, 10*b*, and 10*c* are configured in partially different manners from each other, but are basically the same. As such, when these vehicles do not need to be distinguished from each other, they are simply referred to as vehicles 10. Further, a plurality of members having substantially the same configuration but being distinguished by the alphabet because their arrangement positions are different, when it is not necessary to distinguish them, only the numbers are attached to the members.

The moving device 1 is remotely operated by a control device (not shown) via a transceiver (not shown) provided in one of the vehicles 10. At this time, the operator of the moving device 1 moves the moving device 1 on a structure to be inspected based on an image captured by a camera (not shown) provided in one of the vehicles 10 and information on the surrounding shape based on other measuring instruments.

In the following, a state in which the moving device 1 moves while being grounded to a plane is a reference of a direction, a direction perpendicular to the traveling direction of the moving device 1 and parallel to the plane is referred to as a left-right direction, and a direction perpendicular to the traveling direction and the left-right direction is referred to as a vertical direction. Further, the traveling direction on the vehicle 10*a* side is referred to as the front side, the traveling direction on the vehicle 10*c* side is referred to as the rear side, the installation surface side in the vertical direction is referred to as the lower side, and the other side is referred to as the upper side.

Configuration of Vehicle

Figure 2:
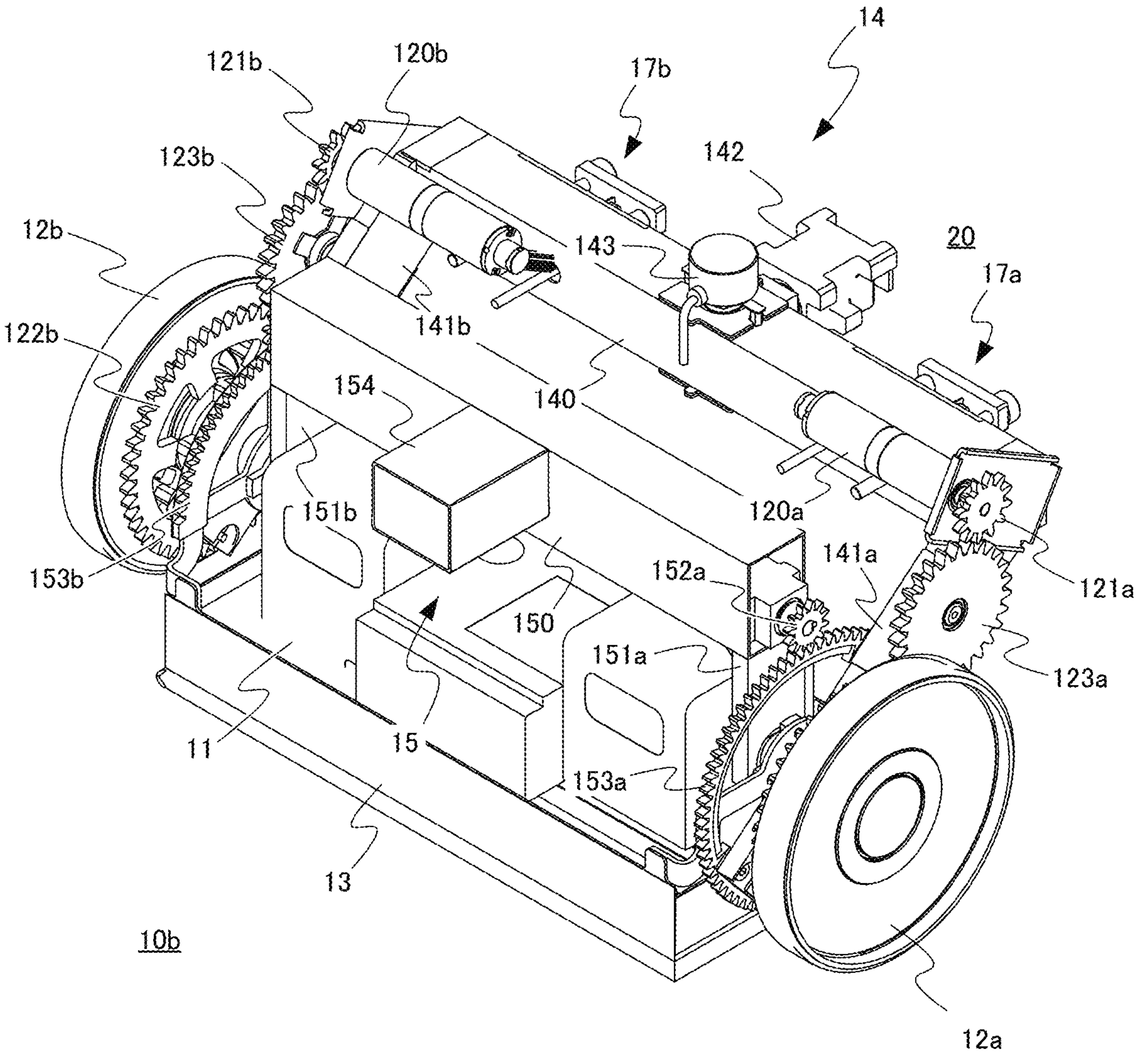
FIG. 2 is a perspective view of a vehicle according to the embodiment.
Figure 3:
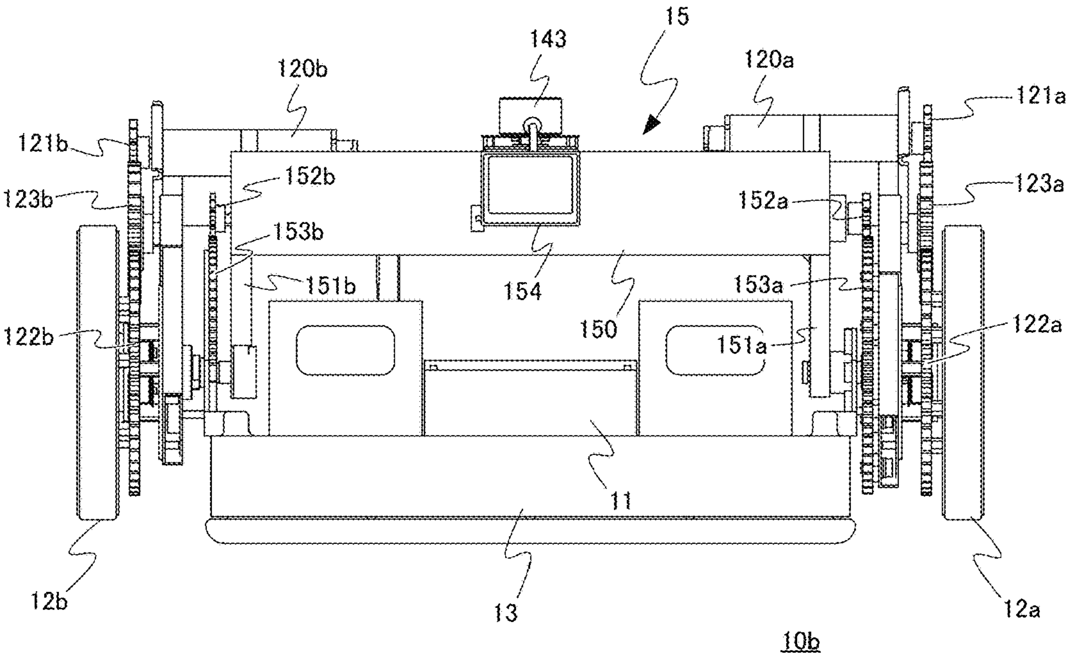
FIG. 3 is a front view of the vehicle.
Figure 4:
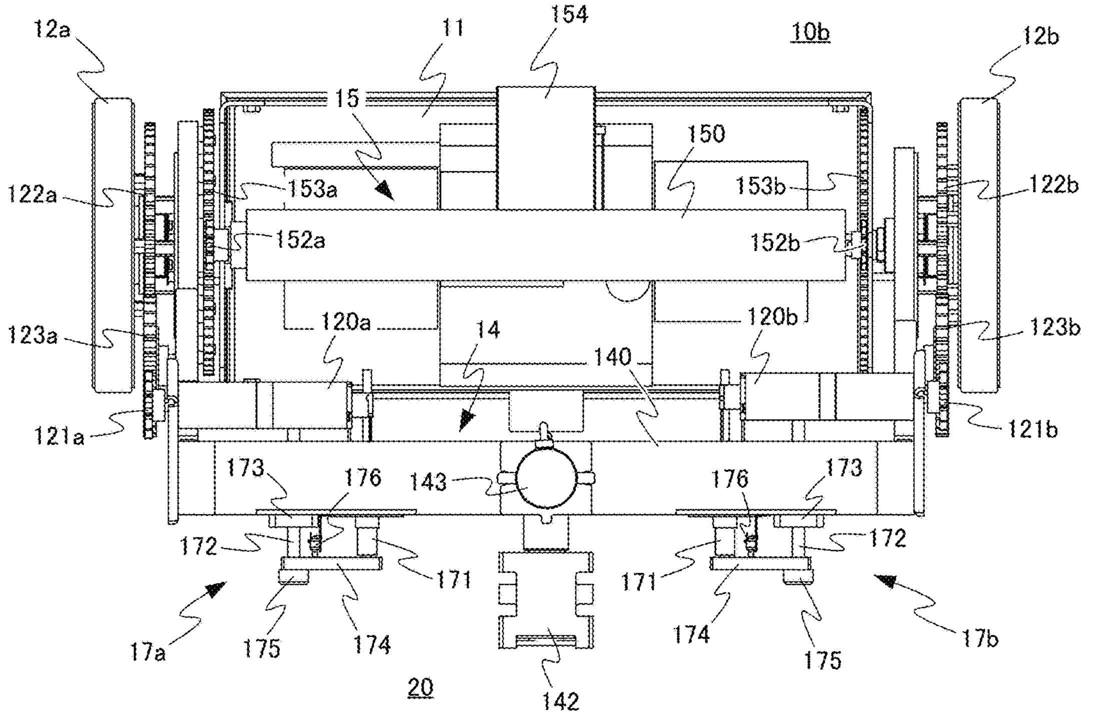
FIG. 4 is a plan view of the vehicle.
Figure 7:
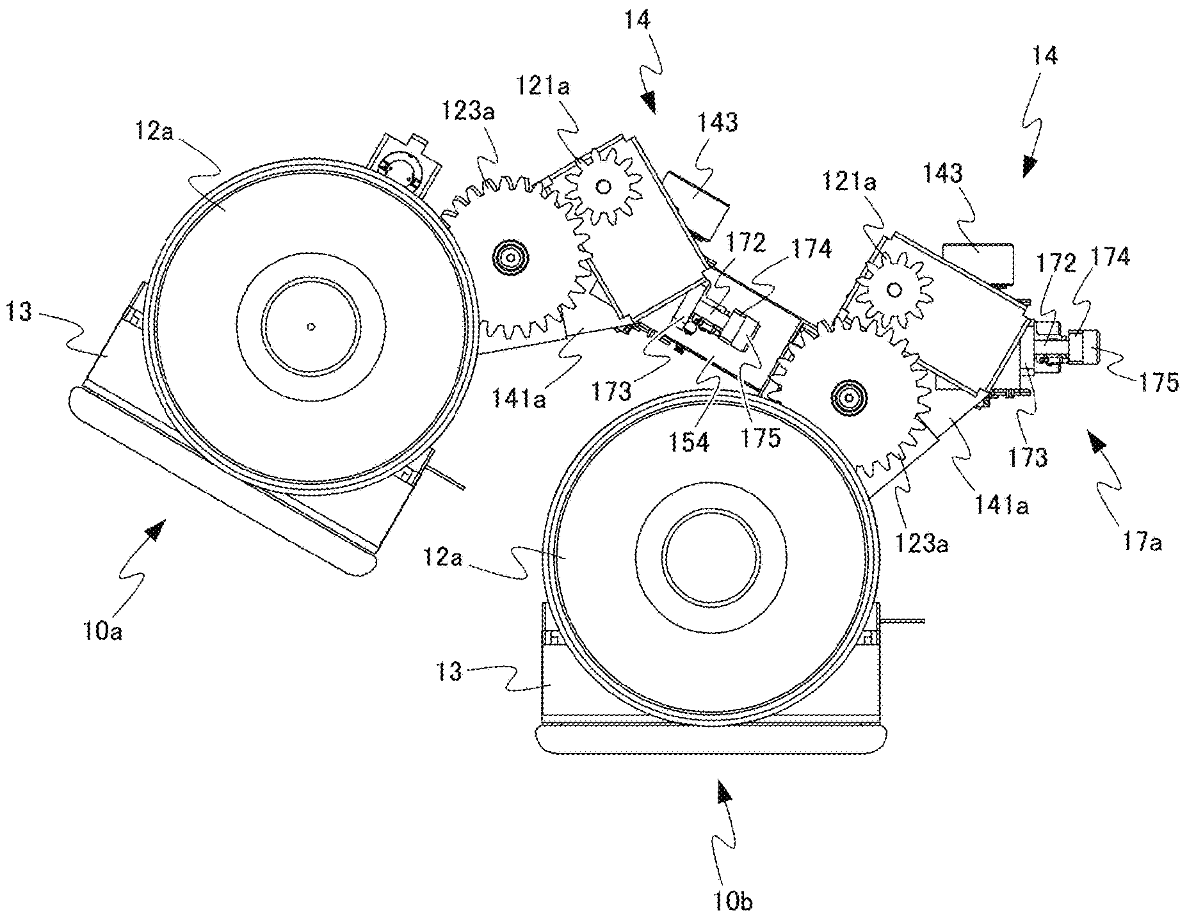
FIG. 7 is a side view of the moving device during pitching operation.

The configuration of a vehicle will be described. FIG. 2 is a perspective view of the vehicle according to the present embodiment. FIG. 3 to FIG. 6 are a front view, a plan view, a bottom view, and a side view of the vehicle, respectively. FIG. 7 is a side view of the moving device during pitching operation. In the following, the vehicle 10*b* including a large link and a small link will be described as a representation of the vehicles 10*a*, 10*b*, and 10*c*. FIG. 7 shows a condition in which the vehicle 10*b* located second from the head pitches the vehicle 10*a* at the head.

As shown in FIGS. 2 to 6, the vehicle 10*b* includes a main body 11, two wheels 12*a* and 12*b*, a partition portion 13, a large link 14, a small link 15, and a yawing restricting device 20. An accommodation space for accommodating various components is defined in the main body 11, and at least a fan (not shown) constituting an adhesion mechanism together with the partition portion 13 is provided in the accommodation space. The main body 11 includes a fixed gear 153*b* for rotating the main body 11. The two wheels 12*a* and 12*b* are disposed on both sides of the main body 11 in the left-right direction such that the rotating shafts thereof are oriented in the left-right direction and the rotational axes of the two wheels 12*a* and 12*b* coincide with each other.

Figure 5:
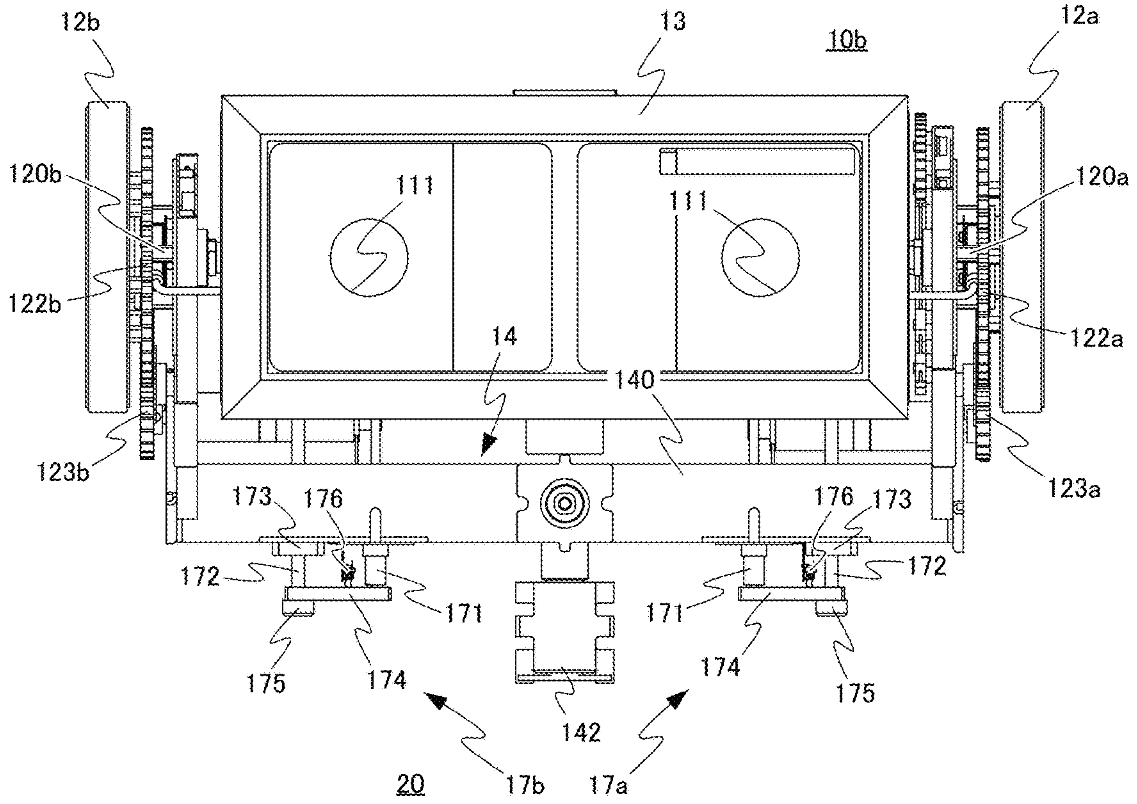
FIG. 5 is a bottom view of the vehicle.
Figure 6:
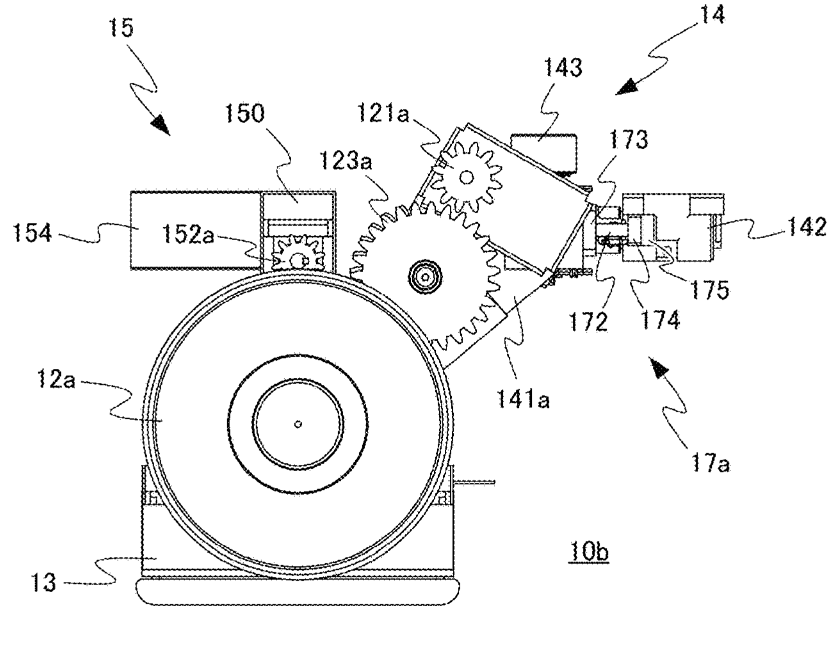
FIG. 6 is a side view of the vehicle.

When the attitude of the main body 11 of the vehicle 10*b* is not rotated pitch-wise, that is, when the main body 11 is substantially parallel to the surface with which the wheels 12 are in contact, the main body 11 is vertically separated by a predetermined distance from the surface. The space between the main body 11 and the surface is defined as an adhesion space enclosed by the partition portion 13 in all directions perpendicular to the vertical direction. As shown in FIG. 5, an intake hole 111 is formed on the bottom surface of the main body 11 to communicate the accommodation space and the adhesion space, and air in the adhesion space is discharged to the outside by the fan through the intake hole 111. This enables the vehicle 10*b* to adhere to the surface. Assume that the partition portion 13 is at least partially formed of a flexible member.

The vehicle 10*b* includes, as traveling drive mechanisms for rotating the two wheels 12*a* and 12*b*, two traveling drive portions 120*a* and 120*b*, two traveling drive gears 121*a* and 121*b*, two traveling transmission gears 122*a* and 122*b*, and two intermediate gears 123*a* and 123*b*. The traveling drive portion 120*a*, the traveling drive gear 121*a*, the traveling transmission gear 122*a*, and the intermediate gear 123*a* are provided in corresponding to the wheel 12*a*. Similarly, the traveling drive portion 120*b*, the traveling drive gear 121*b*, the traveling transmission gear 122*b*, and the intermediate gear 123*b* are provided in corresponding to the wheel 12*b*.

The traveling drive portion 120 is a motor for rotating the traveling drive gear 121. The traveling transmission gear 122 is provided so as to be integrally rotatable with the corresponding wheel 12 and engaged with the intermediate gear 123. The intermediate gear 123 is provided so as to be engaged with the traveling drive gear 121 and the traveling transmission gear 122. The driving force of the traveling drive portion 120 is transmitted to the corresponding wheel 12 via the traveling drive gear 121, the intermediate gear 123, and the traveling transmission gear 122. Among the traveling drive mechanisms, the traveling drive portion 120, the traveling drive gear 121, and the intermediate gear 123 are provided on the large link 14 in the vehicles 10*a* and 10*b*, and provided on the small link 15 in the vehicle 10*c* (see FIG. 1).

The large link 14 is formed so as to extend in the left-right direction, and includes a base 140 positioned above and behind the main body 11, two connecting portions 141*a* and 141*b* connecting both ends of the base 140 with the main body 11, a coupling portion 142, a yaw rotation portion 143, and a pitch fixed gear 152*a*. The coupling portion 142 is a member that extends in a direction perpendicular to the vertical direction and crossing the extending direction of the base 140, that is, the left-right direction, and is coupled to the small link 15 of another vehicle 10. The yaw rotation portion 143 is connected to the front end portion of the coupling portion 142, and is able to rotate the coupling portion 142 in the yaw direction by a predetermined angular range. The yaw direction indicates a rotation direction around an axis in the vertical direction. As will be described in detail later, the coupling portion 142 is coupled to the small link 15 of another vehicle 10, and thus, when the coupling portion 142 is rotated in the yaw direction by the yaw rotation portion 143, the vehicle 10*b* can be yawed with another vehicle 10 coupled by the coupling portion 142 as a base point, and the traveling direction of the moving device 1 can be changed.

The small link 15 includes a base 150, two connecting portions 151*a* and 151*b*, a main body driving gear 152*b*, and a coupling portion 154. The base 150 is formed so as to extend in the left-right direction and is positioned above the main body 11 and in front of the large link 14. Each of the two connecting portions 151*a* and 151*b* is formed so as to extend in the radial direction of the wheel 12, and at the left end and the right end of the main body 11, one end is rotatably connected to the rotating shaft of the wheel 12, and the other end is connected to the left end and the right end of the base portion 150.

The pitch fixed gear 152*a* and the main body driving gear 152*b* are respectively rotated by two drive units (not shown), which are motors rotating about an axis oriented in the left-right direction. The pitch fixed gear 152*a* is engaged with the fixed gear 153*a*, and the main body driving gear 152*b* is engaged with the fixed gear 153*b*. The two fixed gears 153*a* and 153*b* are formed to have diameters so as to be always engaged with the pitch fixed gear 152*a* and the main body driving gear 152*b*, respectively, and are respectively fixed at the connecting portion 141*a* of the large link 14 and the right end of the main body 11 so as not to be rotatable.

The coupling portion 154 is formed in a rectangular cylindrical shape so that the coupling portion 142 of the large link 14 provided in the vehicle 10 in front of and adjacent to the vehicle 10*b* can be inserted in the coupling portion 154 from the front, and is screwed to the coupling portion 142 while the coupling portion 142 is inserted therein, whereby the vehicle 10*b* and another vehicle 10 can be connected to each other. According to such a small link 15, the pitch fixed gear 152*a* is driven to rotate, and the base 150 is thereby rotated about the axis facing the left-right direction, and as shown in FIG. 7, the vehicle 10*a* in the front, which is connected via the coupling portion 142, is pitched. Further, the main body driving gear 152*b* is driven to rotate, and the main body 11 can be thereby rotated about the axis facing the left-right direction with respect to the base 150.

Configuration of Yawing Restricting Device

Figure 8:
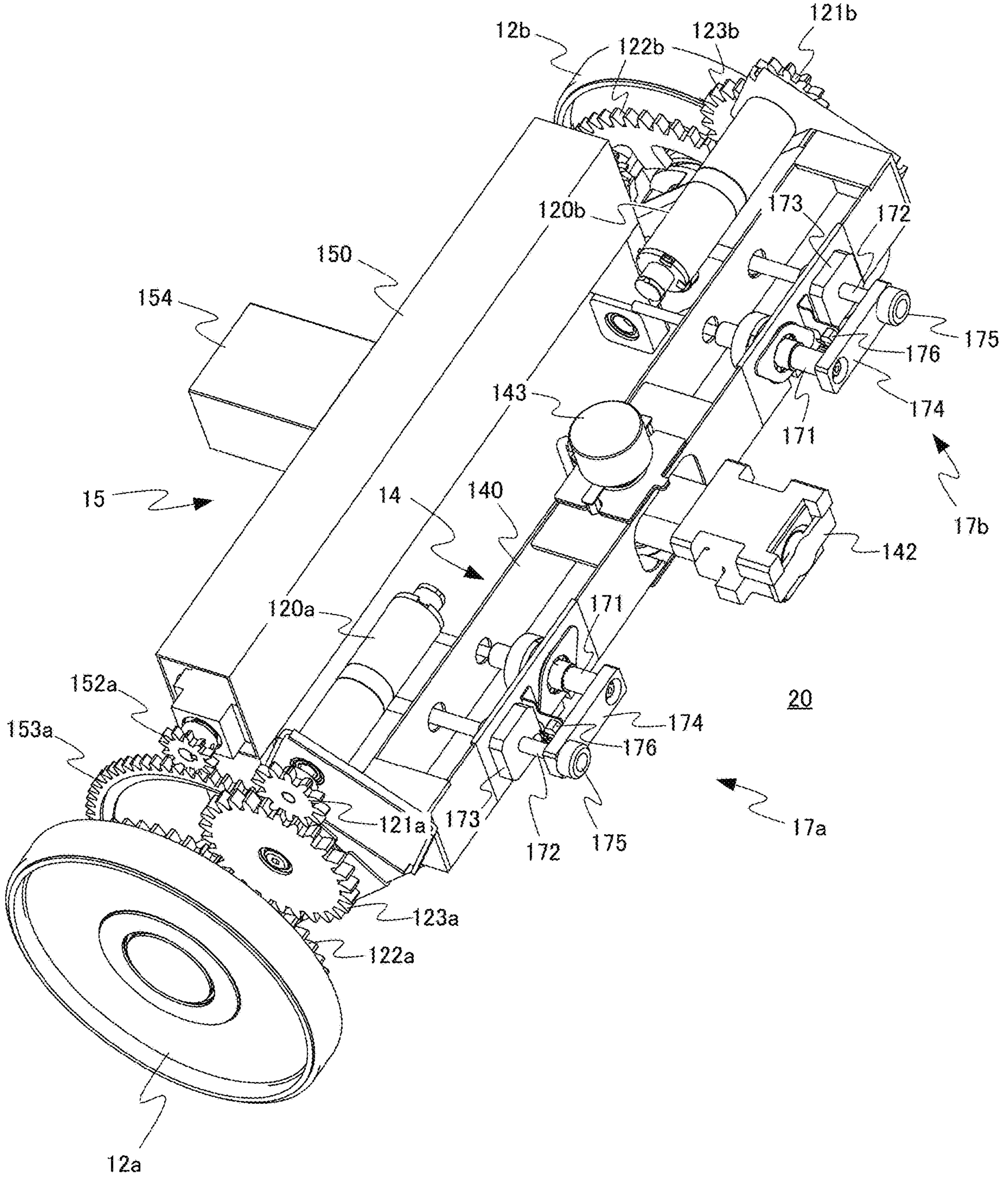
FIG. 8 is a rear perspective view of the yawing restricting device.
Figure 9:
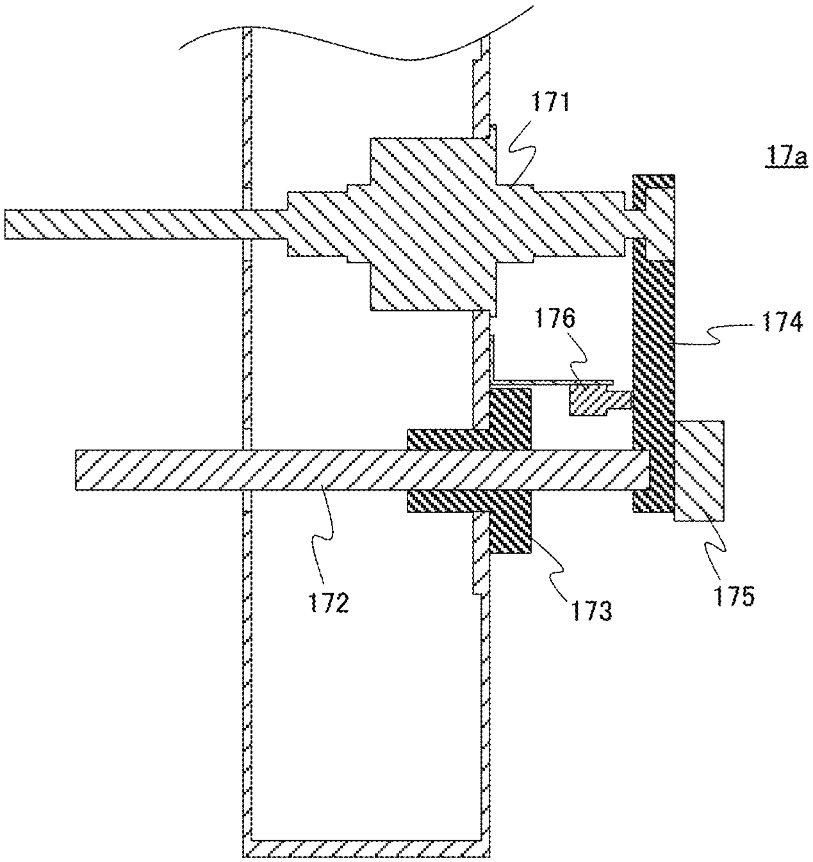
FIG. 9 is a schematic cross-sectional view of the yawing restricting device.

The configuration of the yawing restricting device will be described. FIGS. 8 and 9 are respectively a rear perspective view and a schematic cross-sectional view of the yawing restricting device. Among the two yawing restricting portions, FIG. 9 shows only the large link on the left side being cut by a plane facing the front-rear direction and the left-right direction.

As shown in FIG. 8, the yawing restricting device 20 includes two yaw restricting portions 17*a* and 17*b* provided at the base 140 of the large link 14 so as to sandwich the yaw rotation portion 143 from the left and right sides. Specifically, the yaw restricting portion 17*a* is provided on the left side of the yaw rotation portion 143 at the base 140, and the yaw restricting portion 17*b* is provided on the right side of the yaw rotating portion 143 at the base 140. The two yaw restricting portions 17*a* and 17*b* are provided so as to be substantially symmetrical to each other with respect to the plane, which passes through the rotating shaft of the yaw rotation portion 143, i.e., the yaw axis, and is perpendicular to the two yaw restricting portions 17*a* and 17*b* in the vertical direction and the front-rear direction.

As shown in FIGS. 8 and 9, the yawing restricting portion 17 includes a restriction driving portion 171, a guide shaft 172, a linear bush 173, a connection block 174, a contact portion 175, and a position sensor 176. The restriction driving portion 171 is a linear actuator that linearly moves a movable shaft in the front-rear direction. The movable shaft is a rod-like member provided at the base portion 140 of the large link 14 and formed such that the axial direction thereof faces the front-rear direction. The guide shaft 172 is a rod-like member formed such that the axial direction thereof faces the front-rear direction, that is, so as to extend in the driving direction of the restriction driving portion 171. The guide shaft 172 is positioned outward in the left-right direction with respect to the restriction driving portion 171 and is provided in the base 140 so as to be movable only in the front-rear direction via the linear bush 173.

The connection block 174 is a substantially plate-like member extending in the left-right direction, and connected to one rear end of the movable shaft of the restriction driving portion 171 and one rear end of the guide shaft 172. In this manner, the connection block 174 is moved in the front-rear direction by the restriction driving portion 171, and the guide shaft 172 is linearly moved in the front-rear direction. The restriction driving portion 171 is connected to the guide shaft 172, which thereby receives a load applied in the left-right direction and the vertical direction. This prevents the restriction driving portion 171 from being damaged.

The contact portion 175 protrudes rearwardly from the connection block 174, and comes into contact with the base 150 of the small link 15 of the vehicle 10, which is adjacent rearward, in a restricted state as will be described later. The position sensor 176 is a switch that is pressed by the connection block 174 in a state where the restriction driving portion 171 is returned to the origin position. The position sensor 176 enables the restriction driving portion 171 to easily return to the origin position.

The two yawing restricting portions 17*a* and 17*b* are not necessarily provided at the base 140 of the large link 14, and may be disposed on the left side and the right side with respect to the yaw axis. Further, the two yawing restricting portions 17*a* and 17*b* may be provided at the small link 15 having the pitch driving mechanism of the vehicle 10 adjacent rearward so as to be in contact with the base 140 of the large link 14 having the yaw rotation portion 143.

Operation of Yawing Restricting Device

Figure 10:
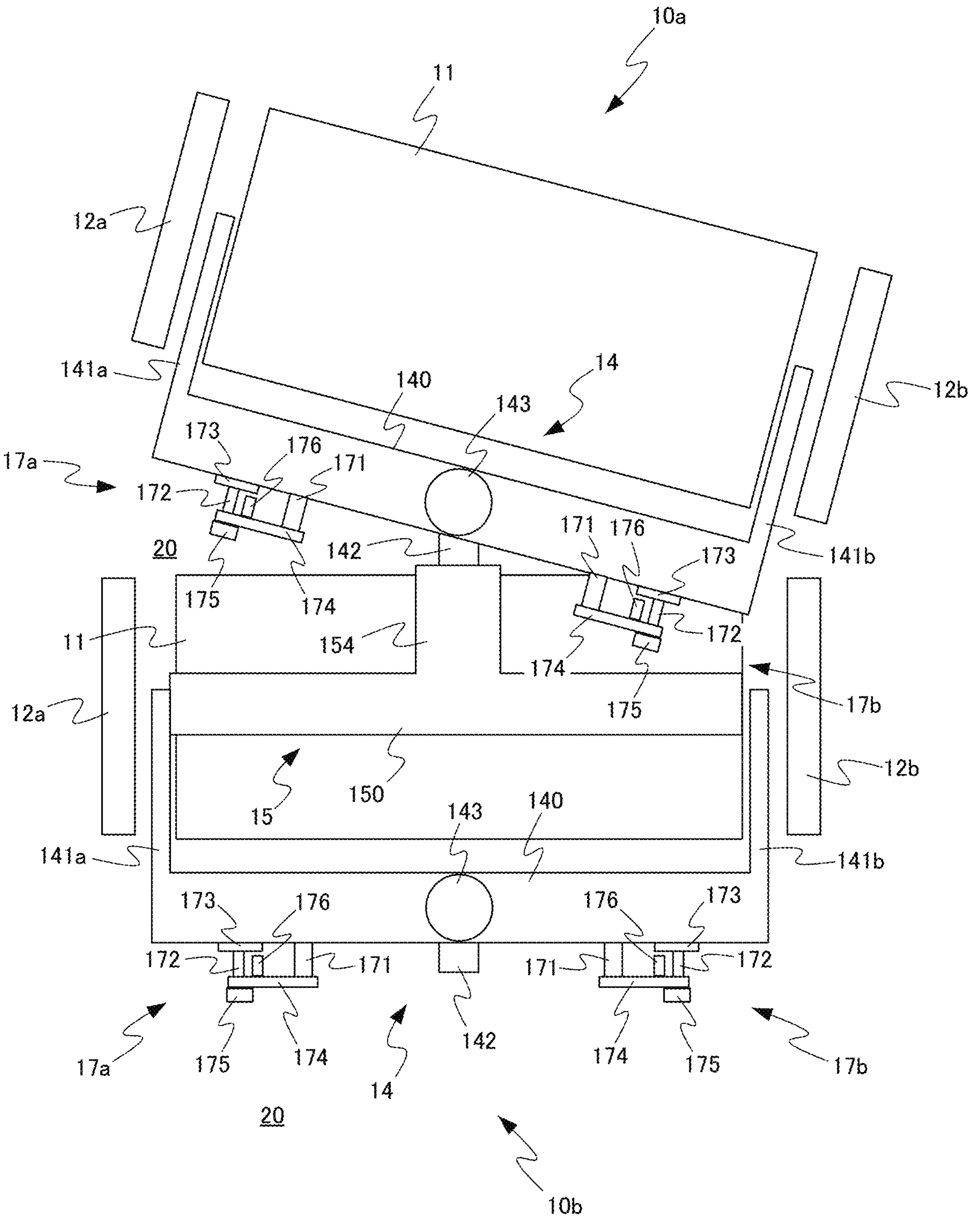
FIG. 10 is a schematic plan views of the moving device in an unrestricted state.
Figure 11:
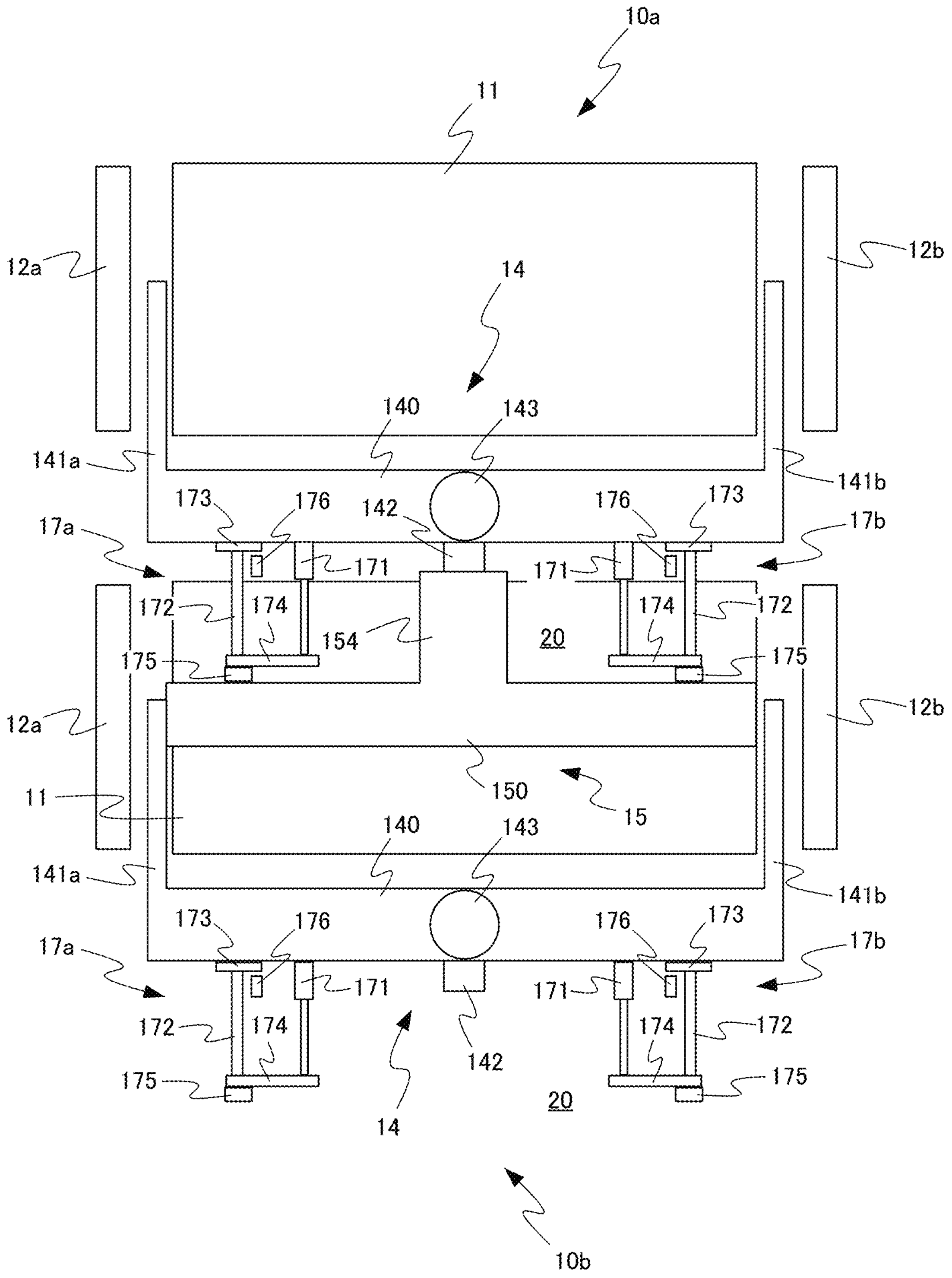
FIG. 11 is a schematic plan views of the moving device in a restricted state.

The operation of the yawing restricting device will be described. FIGS. 10 and 11 are schematic plan views of the moving device in an unrestricted state and a restricted state, respectively. The following description is directed to the yawing restricting device in the first vehicle.

The yawing restricting device 20 is switched between the unrestricted state and the restricted state by driving the restriction driving portion 171. As shown in FIG. 10, in the unrestricted state, the contact portion 175 of the yawing restricting device 20 provided on the vehicle 10*a* is positioned so as not to be in contact with the base 150 of the small link 15 of the vehicle 10*b* adjacent rearward. As such, the vehicle 10*a* can be yawed by the yaw rotation portion 143 of the large link 14.

The yawing restricting device 20 is switched from the unrestricted state to the restricted state when the direction of the wheels 12 of the vehicle 10*a* and the direction of the wheels 12 of the vehicle 10*b* coincide with each other. As shown in FIG. 11, in the restricted state, the contact portion 175 of the yawing restricting device 20 provided in the vehicle 10*a* is in contact with the base 150 of the vehicle 10*b* from the front side, thereby preventing unintended yawing of the vehicle 10*a*. Specifically, the yawing restricting portion 17*a* located on the left side in FIG. 11 restricts the swing of the vehicle 10*a* in the counterclockwise direction around the yaw axis in a plan view in FIG. 11, and the yawing restricting portion 17*b* located on the right side restricts the swing of the vehicle 10*a* in the clockwise direction around the yaw axis.

As described above, the yawing restricting device 20 fixes the vehicle 10 at a position separated from the yaw axis so as not to yaw, thereby restricting the yawing using a smaller driving force as compared with a case where the yawing is restricted by driving the yaw rotation portion 143 so as to maintain the forward movement. This results in further reducing the size and the weight of the structure related to the restriction of yawing. The guide shaft 172 and the contact portion 175 are preferably provided at positions separated from the yaw rotation portion 143 further outward in the left-right direction. This can restrict the yawing with a smaller driving force, and a load applied to the restriction driving portion 171 can be reduced.

The embodiment of the present invention has been presented by way of example only, and is not intended to limit the scope of the invention. The novel embodiment described herein may be embodied in a variety of other forms; furthermore, various omissions, substitutions, and changes may be made without departing from the spirit of the invention. The embodiment and modifications are included in the scope or spirit of the present invention and in the appended claims and their equivalents.

LIST OF REFERENCE NUMERALS

1: moving device
10: vehicle
20: yawing restricting device
171: restriction driving portion
172: guide shaft
174: connection block
175: contact portion
176: position sensor

The invention claimed is:

1. A yawing restricting device provided in a first vehicle to restrict yawing, the first vehicle and a second vehicle being coupled to each other in succession in a traveling direction such that one of the first vehicle or the second vehicle is capable of yawing, the yawing restricting device comprising:

a first contact portion provided to be able to contact with the second vehicle on one side of the first vehicle in an axle direction with respect to a yaw axis;

a second contact portion provided to be able to contact with the second vehicle in a second side in the axle direction with respect to the yaw axis;

a first restriction driving portion that drives the first contact portion so as to be in contact with the second vehicle;

a second restriction driving portion that drives the second contact portion so as to be in contact with the second vehicle, wherein each of the first restriction driving portion and the second restriction driving portion is a linear actuator that drives a movable shaft, which is a rod-like member extending in one direction, in an extending direction of the movable shaft as a driving direction;

a first guide shaft that is formed to be extending in the driving direction of the first restriction driving portion on one side of the axle direction and provided to be movable only in the driving direction of the first restriction driving portion;

a first connection block that connects the first guide shaft with the movable shaft of the first restriction driving portion;

a second guide shaft that is formed to be extending in the driving direction of the second restriction driving portion on the second side of the axle direction and provided to be movable only in the driving direction of the second restriction driving portion; and a second connection block that connects the second guide shaft with the movable shaft of the second restriction driving portion, wherein:

the first contact portion is provided in the first connection block, and the second contact portion is provided in the second connection block, the first guide shaft is positioned on an outer side in the axle direction relative to the movable shaft of the first restriction driving portion and the second guide shaft is positioned on the outer side in the axle direction relative to the movable shaft of the second restriction driving portion such that the first restriction driving portion and the second restriction driving portion are between the first guide shaft and the second guide shaft in the axle direction, and the first contact portion is provided on the outer side in the axle direction within the first connection block, and the second contact portion is provided on the outer side in the axle direction within the second connection block, such that the first contact portion is aligned with the first guide shaft in the driving direction and the second contact portion is aligned with the second guide shaft in the driving direction.

2. The yawing restricting device according to claim 1, further comprising:

a first position sensor configured to detect an origin position of the first restriction driving portion; and a second position sensor configured to detect an origin position of the second restriction driving portion.

* * * * *